INVENTOR.
DAVID N. REESE
BY Robert O. Vidas
ATTORNEY

United States Patent Office 3,090,234
Patented May 21, 1963

3,090,234
CONDITION RESPONSIVE DEVICES
David N. Reese, Mound, Minn., assignor to Minneapolis-Honeywell Regulator Company, Minneapolis, Minn., a corporation of Delaware
Filed Sept. 6, 1961, Ser. No. 136,355
12 Claims. (Cl. 73—356)

The present invention relates to new and useful improvements in condition responsive devices which are arranged to indicate the extent of exposure to certain temperatures. More particularly, this invention relates to an apparatus that is arranged to visually indicate the integrated time-temperature history of an article such as frozen food or the like, as disclosed in copending application, Serial No. 754,573, now Patent No. 3,046,786, filed August 12, 1958, in the name of Bernt M. Tessem, and assigned to the same assignee as the present invention.

The copending Tessem application discloses a device which operates on the principle of the galvanic cell. The cell contains a porous medium impregnated with an electrolyte solution acting as one portion of the circuit. In addition, this porous medium also contains an indicator substance sensitive to a change in pH or the like. In operation, the electrolyte is in a frozen condition at a predesignated temperature and the rate of generation of ions due to the galvanic action corresponds to the temperature of the system. That is, while in the frozen state, the rate of generation of ions at the electrodes is relatively slow, although temperature dependent, while at higher temperatures, in the liquid state, the generation of ions is relatively fast. The ions generated at the electrodes, for example, when the electrodes are copper and tin, consist of hydroxyl ions at the copper electrode and tin ions at the tin electrode. The hydroxyl ions migrate across the porous member at a rate proportional to time and temperature. The indicator substance changes color and the extent to which the color has moved across the porous member provides an integrated indication of the temperature and the time involved.

The device of the copending Tessem application has proved satisfactory to a degree. However, the device as disclosed in that application lacks the desired precision of readability of the moving boundary. Particularly, once the indicator front begins migrating, the leading edge of the boundary assumes a somewhat diffused or indefinite appearance, this indefinite area being on the order of 0.5 mm. This is a major disadvantage since it does not allow for a precise measurement of the distance moved by the colored boundary. As stated above, the distance the boundary has moved is the integrated indication of the time and temperature involved. It is obvious that a more precise measurement of this distance will increase the accuracy of the device.

The improvement of the present invention comprises the inclusion of varying amounts of insoluble compounds containing a metal cation. The addition of such materials has been found to result in a marked sharpening at the front of the migrating colored boundary. By sharply delineating the face of this migrating color boundary, these compounds allow a more precise measurement of the distance covered by this color front.

These insoluble compounds that sharply delineate the migrating boundary can be placed on the porous member in two ways: (1) Reaction of migrating ions with the soluble compound in situ followed by precipitation of the insoluble reaction product containing a metal cation onto the matrix; or (2) impregnation of the matrix with an initially insoluble compound containing a metal cation. In this latter case, these compounds maintain their original form since they do not undergo a chemical reaction, as such, with the migrating ions.

In forming the insoluble compound in situ, the present invention can best be understood with reference to the accompanying drawings wherein.

The exact mechanism for the improved results obtained through the invention is not completely understood. However, the following explanation at least partially accounts for the results obtained with the initially soluble metal salts.

Figure 1:
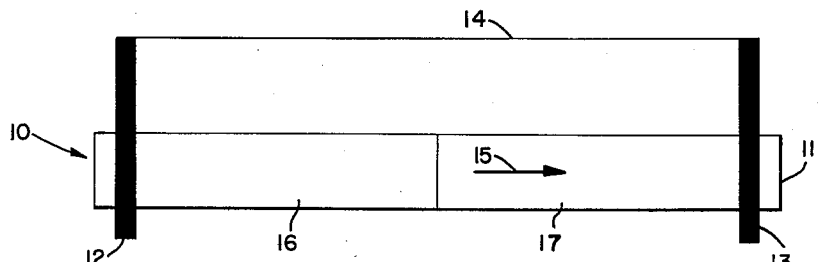
FIGURE 1 is a schematic representation of the device in accordance with the present invention.

Referring now to FIGURE 1, it can be seen that the structure of the device is the same as that disclosed in the Tessem application. In the device shown, the migration of the ions has progressed approximately one half the length of the porous member.

The indicating apparatus, generally designated 10, includes a porous member generally designated 11, such as filter paper or the like, containing an electrolyte solution and having a pair of dissimilar metallic bodies 12 and 13, such as copper and tin respectively, attached at spaced intervals along the paper 11. An external conductor, such as wire 14, is arranged to complete the galvanic circuit which passes through the porous medium 11. The direction of boundary movement is indicated by arrow 15. The basic phase, resulting from the migrating hydroxyl ions and containing the reaction product, such as aluminum hydroxide or the like, is indicated by 16. The acidic phase is indicated as 17. An example of the electrolyte used in conjunction with this device is a solution composed of potassium nitrate (12.3 gms./100 ml. water), potassium chloride (.61 gm./100 ml. water), aluminum chloride (.24 gm./100 ml. water) and Brilliant Yellow indicator (.05% solution).

Figure 2:
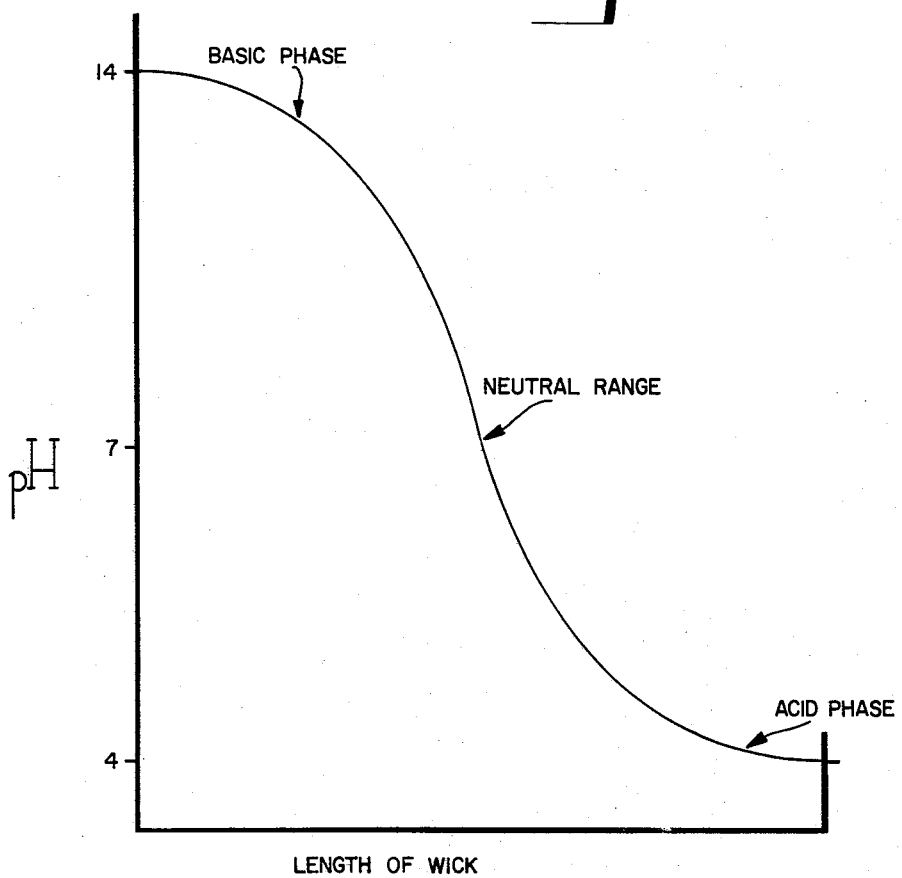
FIGURE 2 is a pH profile graphically representing the porous member of a time-temperature device of FIGURE 1.

Referring now to FIGURE 2, as the basic front moves across the acidic area of the porous member, the pH changes from a relatively acid range to a relatively neutral range. In this neutral pH range, aluminum hydroxide is precipitated. One side of the boundary consists of a basic phase (containing hydroxide precipitate) and the other side consists of a neutral or acidic phase (containing the unprecipitated metal ion).

The rate of diffusion of the hydroxyl ions across the porous member is lowered due to their lower rate of diffusion through the precipitate. This lower rate of diffusion allows the hydroxyl ions to build up in the solid phase and raise the pH to the level required by the indicator for the color change to take place. Thus a sharp, delineated, color front is formed on the moving boundary by the precipitation of the aluminum hydroxide. In this manner, the basic front progresses along the length of the porous matrix.

The rate of diffusion of the hydroxyl ions is also controlled to a certain extent by the removal of the hydroxyl ions from the electrolyte through reaction with the metal ions to form the precipitate. This rate modification can be utilized to adapt the device to various time-temperature situations that require different migration rates of the colored boundary.

It has been found experimentally that all soluble metal compounds, which precipitate in the hydroxide or hydrated oxide form at a pH slightly lower than the pH range of the indicator used, will give satisfactory results. The preferred compounds according to the present invention, have proven to be those containing the following metal cations:

| | |
|---|---|
| Aluminum | Magnesium |
| Barium | Manganese |
| Bismuth | Mercury |
| Cadmium | Molybdenum |
| Calcium | Nickel |
| Chromium | Strontium |
| Colbalt | Tin |
| Copper | Titanium |
| Iron | Vanadium |
| Lead | Zinc |

In order to be most effective in sharpening the color boundary, the insoluble compound containing the metal cation must be present before the color change of the indicator takes place. In the case of an insoluble material that is impregnated on the entire porous member, this consideration is of no importance since the compound is present in an insoluble form at all times. In the case of the precipitation of the insoluble compound in situ, it is necessary that the indicator pH range be above the pH at which the metal compound precipitates so that the precipitate is formed before the color change takes place. Thus, the insoluble compound is available to exert the effect of sharply delineating the color boundary when the color change occurs.

Experimentally it has been shown that the preceding arrangement is necessary to attain the full advantages of the present invention. An indicator e.g., Brilliant Yellow (pH change 6.6–8) was used in combination with a salt e.g., magnesium chloride. This metal hydroxide precipitated at a pH above the pH range of the Brilliant Yellow. The resulting color boundary was hazy. However, the magnesium chloride, when used in combination with an indicator e.g., 5-(p-nitrophenylazo) salicylic acid (pH change 10–12), precipitated before the color change and resulted in a sharply delineated color boundary.

The pH at which the precipitate forms and the indicator change takes place can coincide or the precipitation can even take place at a pH slightly above the indicator change pH and still provide some of the advantages of the present invention. As can be seen from FIGURE 2, the area in which both reactions take place is one of abrupt transition of pH. Thus in both of these cases the precipitate is available as a boundary sharpening agent coincidental with the migrating ions.

The second means for placing an insoluble metal compound on the porous matrix of the device consists in impregnating the matrix with the insoluble compound prior to actual operation. Insoluble metal salts e.g., silver chloride, barium sulphate and calcium oxalate have been found to produce the desired sharp delineation of the colored boundary.

Various means to accomplish this impregnation will suggest themselves to one skilled in the art. In the case of silver chloride, this could be accomplished by dipping the matrix into a solution of silver nitrate. A subsequent dipping of the matrix into a chloride solution results in a precipitation of silver chloride onto the matrix.

The operation of these initially insoluble metal compounds appears to be the same as that of the precipitate previously described. The basic difference between the two means is that one is initially insoluble, impregnated over the entire porous member, and does not undergo a chemical reaction. The other is initially soluble and forms an insoluble reaction product that progressively precipitates across the porous member subsequent to the reaction with the migrating ions.

The present invention is not limited to a device which uses a pH mechanism for color indication. For example, the present invention can be incorporated into a device having iron as one of the eelctrodes and using migrating iron ions and an electrolyte containing thiocyanate ions. The reaction of the iron ions with the thiocyanate to form a complex ion furnishes the color change and the moving boundary. In this instance, the use of an insoluble compound on the porous member also results in a sharply delineated front.

It will be obvious to those skilled in the art that all metallic salts which give a hydroxide or a hydrated oxide precipitate at a pH which is preferably slightly below the pH of the transition range of the indicator used may be employed in the foregoing manner. Virtually any combination of indicator and metallic salt may be used as long as the hydroxide precipitates at a pH which is slightly lower than the pH range of the indicator. Only a few examples have been discussed herein and the meaning of the term hydroxide is to be taken as including all metallic salts which form hydroxides or hydrated oxides as previously discussed.

It will further be obvious to those skilled in the art that initially insoluble compounds containing metal cations e.g., silver chloride, calcium oxalate and barium sulphate will accomplish the objects of this invention.

While the previous discussion has been restricted to applications of the present invention to the device of the copending Tessem application, it will be readily apparent that the invention may be utilized in any indicating system which relies on a color change caused by the migration of ions.

Having thus described the present invention, what I desire to obtain by Letters Patent is:

1. In an indicating system which provides indication of the extent of migration of ions through an electrolyte medium, the method of delineating the leading edge of the boundary of the migrating ions which comprises uniformly distributing within said medium an insoluble compound containing a metal ion as a constituent thereof.

2. In an indicating system which provides indication of the extent of migration of ions through an electrolyte medium, wherein indication is provided by a reaction between the migrating ions and a constituent of said medium resulting in a color change therein, the method of delineating the leading edge of the boundary of the migrating ions which comprises uniformly distributing within said medium an insoluble compound containing a metal ion as a constituent thereof.

3. In an indicating system which provides indication of the extent of migration of hydroxyl ions through an electrolyte medium, the method of delineating the leading edge of the boundary of the migrating ions which comprises uniformly distributing within said medium an insoluble compound containing a metal cation as a constituent thereof.

4. In an indicating system which provides indication of the extent of migration of hydroxyl ions through an electrolyte medium, wherein indication is provided by a pH sensitive indicator, the method of delineating the leading edge of the boundary of the migrating ions which comprises uniformly distributing within said medium a compound containing a metal ion as one constituent thereof, said metal ion forming an insoluble reaction product with said hydroxyl ion at a pH lower than that at which the indicator substance changes.

5. In an indicating system which provides indication of the extent of migration of hydroxyl ions through an electrolyte medium, wherein indication is provided by a pH sensitive indicator, the method of delineating the leading edge of the migrating boundary which comprises uniformly distributing within said medium a metal ion which precipitates in the presence of hydroxyl ions at a pH below the pH range of said indicator.

6. In an indicating system which provides indication of the extent of migration of hydroxyl ions through an electrolyte medium, wherein indication is provided by a pH sensitive indicator, the method of delineating the leading edge of the boundary of the migrating ions which comprises uniformly distributing within said medium a compound containing a metal ion as one constituent thereof, said metal ion forming an insoluble reaction product with said hydroxyl ion at a pH within the pH range at which the indicator substance changes color.

7. In a device for visually indicating the extent to which an article has been exposed to a temperature exceeding a safe predetermined minimum comprising a porous matrix medium containing an electrolyte composition which changes color upon contact with ions migrating across said medium, and having a pair of dissimilar metal bodies, arranged in spaced contact therewith, said bodies connected by an external conductor, the improvement which comprises uniformly distributing within said electrolyte an insoluble compound containing a metal ion as one constituent thereof.

8. The device of claim 7 being further characterized in that said insoluble compound is selected from the group consisting of silver chloride, calcium oxalate and barium sulphate.

9. In a device for visually indicating the extent to which an article has been exposed to a temperature exceeding a safe predetermined minimum comprising a porous matrix medium containing an electrolyte composition which changes color upon contact with ions migrating across said medium and having a pair of dissimilar metal bodies arranged in spaced contact therewith, said bodies connected by an external conductor, the improvement which comprises uniformly distributing within said electrolyte medium a soluble compound containing a metal ion as one constituent thereof, said metal ion forming an insoluble reaction product with said migrating ions prior to said color change.

10. In a device for visually indicating the extent to which an article has been exposed to a temperature exceeding a safe predetermined minimum comprising a porous matrix medium containing an electrolyte composition which changes color upon contact with ions migrating across said medium and having a pair of dissimilar metal bodies arranged in spaced contact therewith, said bodies connected by an external conductor, the improvement which comprises uniformly distributing within said electrolyte medium a soluble compound containing a metal ion as one constituent thereof, said metal ion forming an insoluble reaction product with said migrating ions during said color change.

11. In a device for visually indicating the extent to which an article has been exposed to a temperature exceeding a safe predetermined minimum comprising a porous matrix medium containing an electrolyte composition which changes color upon contact with hydroxyl ions migrating across said medium and having a pair of dissimilar metal bodies arranged in spaced contact therewith, said bodies connected by an external conductor, the improvement which comprises uniformly distributing within said electrolyte medium a soluble compound containing a metal ion as one constituent thereof, said metal ion forming an insoluble reaction product with said migrating hydroxyl ions prior to said color change.

12. The improvement of claim 11 being further characterized in that said soluble compound is selected from the group consisting of aluminum chloride, ferric chloride, bismuth nitrate, mercuric bromide and stannous chloride.

No references cited.